United States Patent [19]
Pond

[11] Patent Number: 5,329,590
[45] Date of Patent: Jul. 12, 1994

[54] AUTOMATIC PAY-PER-VIEW RECEPTION IN A SATELLITE RECEIVER

[75] Inventor: Russell L. Pond, Euless, Tex.

[73] Assignee: Uniden America Corporation, Ft. Worth, Tex.

[21] Appl. No.: 89,674

[22] Filed: Jul. 8, 1993

[51] Int. Cl.$^5$ .......................... H04N 7/173; H04N 1/00
[52] U.S. Cl. ........................................ 380/20; 455/3.2; 455/4.2
[58] Field of Search ................... 380/20; 455/3.2, 4.1, 455/4.2, 5.1

[56] References Cited

U.S. PATENT DOCUMENTS

| | | | |
|---|---|---|---|
| 4,528,589 | 7/1985 | Block et al. ......................... | 358/122 |
| 4,528,663 | 7/1985 | Citta ..................................... | 370/94 |
| 4,599,647 | 7/1986 | George et al. ...................... | 358/122 |
| 4,704,725 | 11/1987 | Harvey et al. ...................... | 380/9 |
| 4,797,918 | 1/1989 | Lee et al. ............................. | 380/20 |
| 4,890,322 | 12/1989 | Russell, Jr. .......................... | 380/20 |
| 4,945,563 | 7/1990 | Horton etal. ....................... | 380/5 |
| 4,977,455 | 12/1990 | Young .................................. | 358/142 |
| 5,003,384 | 3/1991 | Durden et al. ...................... | 358/84 |
| 5,003,591 | 3/1991 | Kauffman et al. .................. | 380/10 |
| 5,031,213 | 7/1991 | Kawasaki ............................. | 380/10 |
| 5,046,093 | 9/1991 | Wachob ............................... | 380/20 |
| 5,081,680 | 1/1992 | Bennett ................................ | 380/50 |
| 5,123,046 | 6/1992 | Levine ................................. | 380/10 |
| 5,144,663 | 9/1992 | Kudelski et al. .................. | 380/20 X |
| 5,195,134 | 3/1993 | Inoue ................................... | 380/20 |

OTHER PUBLICATIONS

A. C. Walle, "HTS Tracker Premier System 7D", Jan. 1993, *Satellite Retailer*, pp. 65–68.

*Primary Examiner*—Gilberto Barrón, Jr.
*Attorney, Agent, or Firm*—Daniel R. Brown

[57] ABSTRACT

An automated pay-per-view activation method is disclosed for use in integrated television receive-only satellite receiver/descramblers. The automated procedure allows for automatic activation of the pay-per-view program event reception from all pay-per-view service providers. Taken in conjunction with a preprogrammed timer function, the present invention provides for the preprogrammed reception of pay-per-view programs in the absence of the operator.

11 Claims, 8 Drawing Sheets

# AUTOMATIC PAY-PER-VIEW RECEPTION IN A SATELLITE RECEIVER

TECHNICAL FIELD OF THE INVENTION

The present invention relates to the automated recording of pay-per-view (PPV) television programming and more particularly to the automated recording of pay-per-view (PPV) programs which are received on a television-receive-only (TVRO) integrated satellite broadcast receiver/descrambler (IRD) and recorded onto video tape using a video cassette recorder (VCR).

BACKGROUND OF THE INVENTION

It is well known that an integrated television receive-only satellite broadcast receiver/descrambler (IRD) is capable of receiving a variety of television program events which are broadcast by a service provider. And that operators often desire to record such program events at the present time for viewing at a later time by interconnecting a video cassette recorder (VCR) to the IRD. Furthermore, it is often desirable for the operator, who is typically a consumer in the home, to preprogram the VCR at the present time to record a program event at a future time so that the program event may be played back and viewed at a point in time still further in the future. To accomplish this recording function, it is necessary for the operator to utilize a timer function and preprogram the VCR to activate its record function at a specific time in the future when the desired program event is to be aired. Likewise, a timer function in the IRD must be employed to preprogram the reception for the desired program event. Then, with the proper cabling interconnecting the output of the IRD to the input of the VCR, the desired program event will be recorded for viewing at a later time. Many IRDs employ a timer function to allow the preprogrammed reception of program events. Such timer functions control various functions of the IRD. The functions controlled by such timers often include; the primary power to the IRD, the direction in which the antenna is pointed, and the radio frequency channel of operation.

In a different aspect of the use of IRD satellite broadcast receivers, it is well known that monetary service fees are charged to operators for the privilege of receiving certain programs. It is well known that these fees are assessed on a recurring basis, frequently at monthly or quarterly intervals.

In order to prevent unauthorized reception of transmitted program events, modern satellite broadcast systems scramble some of the transmitted signals for which an access fee is to be charged. Each IRD which has the capability to descramble the scrambled broadcast signal must have a descrambling device in order to do so. There has been an evolution of descrambling device technology used in the market. This descrambling technology is well known to those skilled in the art. Today, the descrambling devices popularly in use comprise a proprietary electronic circuit board inserted into the IRD. The descrambling device employs software to implement a complex and secure descrambling algorithm. The descrambling devices also provide other functions which may include communications with the service provider, interface to the receiving circuitry in the IRD, generation of operator menus on the TV screen, and storage of usage history and other data. IRD manufacturers do not develop or manufacture descrambling devices, but rather, IRD manufacturers purchase these devices from a third party and incorporate them into the IRD's that they manufacture. The principal descrambling devices in use today are the VideoCipher II, VideoCipher II Plus, VideoCipher II Plus MOM, and VideoCipher RS which are manufactured or licensed by General Instruments Corporation. These devices are often simply identified as VCII modules.

The VCII descrambling modules are proprietary in their design. Manufacturers are provided with mechanical, electrical, and protocol interface specifications that enable them to incorporate the VCII descrambling modules into the IRDs that they manufacture. The full interface specification is available from General Instruments Corporation, VideoCipher Division, 6262 Lusk Boulevard, San Diego, Calif. 92121-2743. The electrical interface to the descrambler is interfaced with a modified microprocessor bus in the IRD thus providing communications between the IRD and descrambler. The protocol specification includes a set of commands that allow the IRD to send instructions to the descrambler and for the IRD to receive responses from the descrambler. The commands sent to the descrambler by the IRD are interpreted from keystrokes entered by the operator. These commands include the following keystrokes:

| | |
|---|---|
| [VIEW] | Selects viewing mode |
| [NEXT] | Selects next program |
| [SETUP] | Selects SET-UP menu |
| [TEXT] | Provides text for function |
| [MSG] | Displays message |
| [0]-[9] | Enters digits |
| [ENTER] | Performs selection |
| [CNCL] | Cancels selection |
| [(left arrow)] | Data input per function |
| [(right arrow)] | Data input per function |
| [HELP] | Requests help information |

These commands are used to control the function of the descrambler and to send enabling, initializing and activating commands to the descrambler to control the descrambling function.

Responses are generated within the descrambler and communicated to the IRD. Some responses are composed of alpha-numeric characters which are displayed on the TV. Others are communicated to the IRD microprocessor via the microprocessor bus. Some of the responses include:

| | |
|---|---|
| "QUERY" | Request for receiver state |
| "NUMMODE" | Allows activation of descrambler |
| "CHANMODE" | Descrambler is active |

Each of these commands is interpreted by the IRD to determine the state of the descrambler and other functions. Therefore, activation of the descrambler involves the input of information, via keystroke entry to the descrambler, and receiving the appropriate response from the input.

Considering now the monetary service fee which is charged for the reception and descrambling of scrambled satellite broadcast program events, service providers activate the descrambling device on an operator's IRD for a periodic service fee. The IRD is thus activated to descramble scrambled program events for the duration of the period. There is no limit placed on the number of program events that may be viewed by the operator during the service period. However, service providers have a need and a desire to charge a monetary service fee on a per event basis for singular and one-time program events.

In recent years an alternative method of assessing service fees to operators has become popular. In this alternative method, the operator is assessed a service fee on a demand basis for each particular program event viewed. This method of billing is commonly called pay-per-view (PPV) or instant-pay-per-view (IPPV). The operator may select a desired program event from a program listing and adjust his IRD to receive the program event at a time just prior to or just after the time the desired program event begins. The adjustments required to the IRD include pointing the receiving antenna toward the satellite broadcasting the signal and tuning to the desired channel from the plurality of channels broadcast. Having done this, the operator must initialize and activate the PPV function so as to acknowledge the PPV monetary fee and accept the program event. The initialization and activation procedures are accomplished by manually entering keystroke commands as prompted by the descrambler on the TV screen and in accordance with the particular service provider. Often, this initialization and activation procedure includes the entering of a security password. Such password provides security to the operator in preventing unauthorized purchases of PPV programming.

There are several PPV service providers currently broadcasting PPV program events. Among these are Action Pay-Per-View, Cable Video Store (CVS), Touchstone Video Network (TVN), Request TV, and others. Each of these service providers may have a somewhat different PPV initialization and activation procedure. Furthermore, the specific activation procedure may be different depending on the access period. The access period is defined by the relationship between the time the initialization and activation procedure is executed and the time the program event begins airing.

The access periods falls into six categories. Access period one occurs long before the desired program event begins to air. During period one, the access to the program event can be denied because the program will not begin within a reasonable time period. The duration of the reasonable time period varies between service providers. It is also likely that another program event is airing during access period one, further explaining why descrambler access is denied during access period one.

Access period two occurs just prior to the beginning of a program event and follows the end of access period one. During period two, descrambler access can be gained, however additional keystroke entry is usually required to inform the descrambler that the subsequent program event is desired, as opposed to the current program event. Access period two begins a reasonable time period prior to the beginning of the program event. The duration of this period varies between service providers. During access period two, the previous program event may or may not be concluding.

Access period three also occurs just prior to the beginning of the desired program event. It differs from access period two in that the service provider is airing an advertisement for the subsequent or other future program events. Sometimes, an additional keystroke is required to exit the period three mode prior to activating the descrambler. The presence or absence of access period three depends on the service provider.

Access period four begins at the beginning of the desired program event and is defined as a short period of time when the service provider does not scramble the broadcast signal, but rather, allows IRDs to receive the broadcast without the need to descramble the signal. This is possibly done to encourage operators to decide to purchase the balance of time for the program event. During this period, the descrambler activation may be executed. The required keystroke commands may vary between service providers during access period four.

Access period five is defined as a period of time which begins after the desired program event has begun. During this period, the service provider is scrambling the signal and the operator may activate the descrambler to descramble the signal. The duration of this period varies widely between service providers. Some service providers allow activation of the descrambler up to the end of a program event's broadcast.

Access period six is a period of time which begins after the desired program event has begun and during which the service provider will not allow the activation of the descrambler by the operator. The purpose of this period is to prevent the purchase of PPV programs when there is insufficient program time remaining.

For each of the above cited periods and depending on which service provider is broadcasting the program event, a somewhat different keystroke entry sequence may be required to activate the descrambler in order to receive a program event. The descrambler provides a menu driven user interface that guides the user through the activation procedure. As was noted, descrambler activation is not possible during certain access periods. It may be, for example, necessary for the operator to wait until access period one has expired before executing the activation procedure.

The initialization and activation procedure is accomplished by entering keystroke commands to the IRD which are communicated to the descrambler via the internal microprocessor bus. It is not difficult for an operator to manually initialize and activate a PPV program event because the operators is prompted on the TV screen by the descrambler as to what entries are required at each moment.

As with other program events which are not scrambled, operators desire the ability to preprogram their IRD to receive pay-per-view programs in their absence, therefore, there is a need to automate the PPV program initialization and activation procedure so that it may be accomplished without the operator being present to actuate keystroke commands to the descrambler and IRD. The solution to automating the PPV initialization and activation procedure is complicated by the different initialization and activation procedures required by different PPV programming service providers and by the different access periods during which an initialization and activation procedure is attempted.

The manual initialization and activation of the PPV descrambling function in IRD satellite broadcast receivers has placed certain limits on the ability of operators to record program events which are purchased on a pay-per-view basis. Although pay-per-view program events can be recorded at the present time for viewing at a future time by manually initializing and activating the IRD satellite receiver pay-per-view function and activating the VCR record function, operators have a need to automate the recording of pay-per-view programs. Such automation would allow the operator to program the IRD to facilitate recording a program event at a future point in time for viewing at a point in time still further in the future.

SUMMARY OF THE INVENTION

The present invention automates the initialization and activation procedure for receiving pay-per-view (PPV) program events on an integrated television receive only satellite broadcast receiver/descrambler (IRD). A method is disclosed whereby an operator preprograms an IRD to enable the automatic initialization and activation of the PPV descrambling function in an IRD. The present invention is integrated with a timer function in an IRD to facilitate the preprogramming of the PPV initialization and activation at the present time for reception of a desired program event at a future point in time. A method is employed which sequentially executes commands that enable the automated initialization and activation of the PPV function for all currently known PPV service provider activation sequences during all of the access periods in which it is possible to activate the pay-per-view function. In addition, the method of the present invention allows for a window of time during which the method will make repeated attempts to initialize the PPV function, thereby allowing for variations between the real time clock in the IRD and the actual time used by the broadcast service provider.

Thus, an operator can preprogram the reception of a program event with a simple keystroke entry procedure which will activate the reception of program events from all known service providers even though the actual initialization and activation procedure may be different for different service providers. The operator need not be concerned about which service provider is broadcasting the desired program event because the method of the present invention automatically executes a sequence of command steps that will initialize and activate the descrambling and reception of any PPV program event. Furthermore, a password security protection scheme is supported within the preferred embodiment which provides security for the operator in preventing unauthorized reception of PPV program events.

Taken in conjunction with a timer function, the preprogrammed PPV initialization and activation also controls several functions in the IRD. These functions include control of the primary power, control of the direction in which the satellite receiving antenna is pointed, selection of the desired channel and other functions.

By coordinating the preprogrammed reception of PPV program events with the preprogrammed record function in a VCR which has been interconnected to the IRD, operators are able to fully automate the video tape recording of PPV program events. The automated method of the present invention allows operators to preprogram the reception and recordation of PPV program events without need to know which service provider is airing a desired program event nor which activation procedure is required to activate the PPV function for the desired program event.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 1:
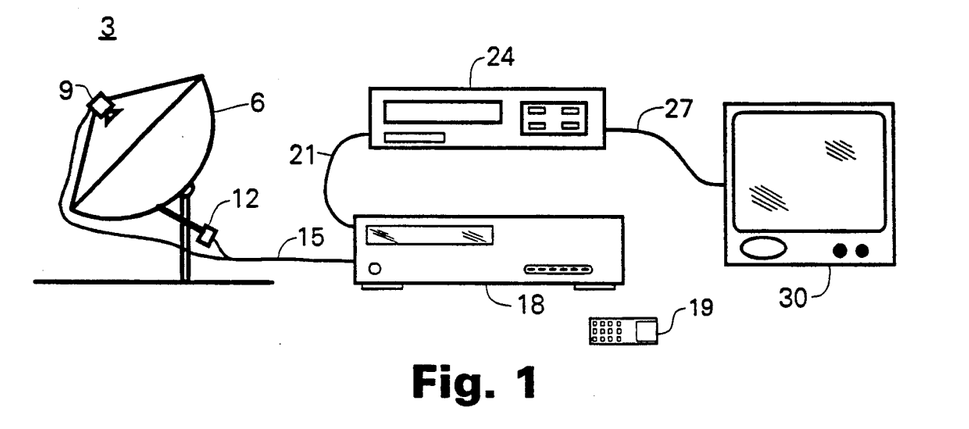
FIG. 1 is a system diagram of the preferred embodiment.

Reference is directed to FIG. 1 which shows a block diagram of the entire satellite broadcast receiving system for viewing and recording program events broadcast from geosynchronous orbit satellites. As shown in FIG. 1, the satellite receiving system comprises an antenna system 3 further comprising a parabolic reflector (dish) 6, a feed horn and low noise block down converter/amplifier assembly (LNB) 9, and an actuator motor/arm assembly (actuator) 12. The satellite receiving system further comprises an integrated television receive-only receiver/descrambler (IRD) 18, such as the Uniden model UST-4500, with accompanying remote control unit 19, a video cassette recorder (VCR) 24, a conventional television receiver/monitor (TV) 30, and interconnecting cable assemblies 15, 21, and 27.

In order for the desired program to be received, the antenna system 3 must be positioned to receive the broadcast signals radiating from a geosynchronous orbit satellite. Positioning of the antenna system 3 is accomplished by the actuator 12 under control of the IRD 18. With the antenna properly aligned to the desired satellite, electromagnetic energy is reflected off the dish 6 into the LNB 9. Interconnecting cable 15 provides multiple functions including carrying the received signal from the antenna system 3 to the IRD 18, carrying control signals for controlling the actuator 12 from the IRD 18 to the actuator 12, and may provide other control functions.

The IRD 18 is often times remotely controlled by a remote control unit 19 for the convenience of the operator. Such remote control units may communicate with the IRD using infrared (I/R) or UHF radio waves (UHF) or both. In the present invention, the remote control unit 19 has several keys which are depressed to cause the IRD to execute commands. The keys on the keypad comprise a numeric keypad having digits [0]-[9], [MENU], [VIEW], [ENTER], [NEXT], [POWER], [CNCL], and others.

The IRD 18 receives a broad band signal from the antenna system 3 and selectively tunes a single channel from the broad band signal. The received signal is frequently scrambled to prevent unauthorized viewing and such scrambling is especially common for programs which are sold on a pay-per-view (PPV) basis. Accordingly, the IRD 18 has a descrambling unit incorporated therein. The descrambling unit is known commercially as a VideoCipher II, VideoCipher II Plus, or a VCII (descrambler). The received and descrambled signal is output from the IRD 18 via cable assembly 21 in composite video format suitable for direct viewing on a TV 30, or, the composite signal can be input into a VCR 24 for recording on video tape.

The IRD 18 also serves as the control unit for the antenna system 3 actuator 12. The user can manually adjust the antenna system 3 direction or control can be assumed by the IRD 18 under preprogrammed control.

The VCR 24 is of the conventional type and can simultaneously record a program and pass the signal through cable assembly 27 to the TV 30. In the preferred embodiment, the VCR 24 has a timed event record function that allows the operator to preprogram the record function to begin and end at a time in the future to facilitate the recording of a desired program event in the absence of the operator Such VCR's with said preprogrammed record functions are well known in the art.

In order for the IRD to descramble a program event, it must be enabled to do so. Modern descrambling schemes are well known in the art and involve several different processes depending on the type of program event and the service provider providing the program event. It is common for the service provider to communicate directly with the VCII module in the IRD. Such communications allows for the transfer of usage and billing information to and from the IRD and for transmission of descrambling key codes which change from time to time. Such communication is accomplished with a telephone modem connected between the end user's voice telephone line and the IRD, or, such communications can occur via direct satellite broadcast to the IRD.

Figure 2:
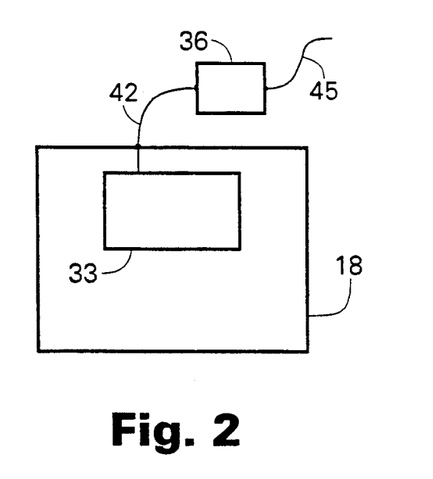
FIGS. 2 and 3 are block diagrams of the integrated receiver/descrambler of the preferred embodiment.

Reference is now directed to FIG. 2 which is a block diagram of an IRD 18 that has incorporated therewith a descrambling unit 33 which is commercially known as a VideoCipher II or VCII (descrambler). In order to accomplish communications between the descrambler and the service provider, a data port is provided on the IRD 18 for interconnecting the descrambler 33 to an external module comprising a modem 36 via cable assembly 42, thereby providing a dial-up data link for communications between the IRD and the service provider. Modem 36 is connected via a cable 45 to the operator's telephone line. The external modem unit is commercially known as a VideoPal and includes interface logic in addition to the modem. Such an IRD and external modem combination is common in satellite broadcast receive systems.

Figure 3:
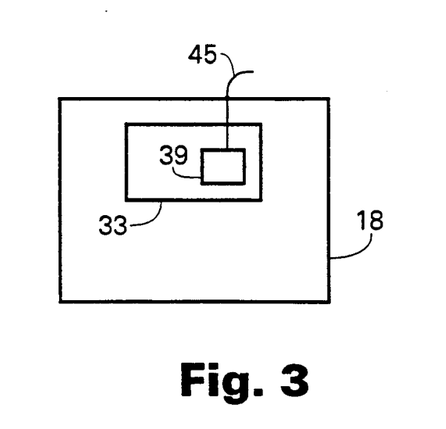

Reference is now directed to FIG. 3 which is a block diagram of an IRD 18 as in FIG. 2, but, a modem 39 is incorporated within the descrambler 33. The descrambler with the built in modem 39 is commercially known as a VideoCipher II Plus MOM This integrated design provides a more compact system and eliminates the interconnecting cable 42, leaving only cable assembly 45 for interconnecting the IRD with the operator's voice telephone line. The IRD's depicted in FIG. 2 and 3 are functionally identical and differ only in the level of integration of the satellite broadcast receive system. Both system designs are commonly known to those skilled in the art.

Figure 4:
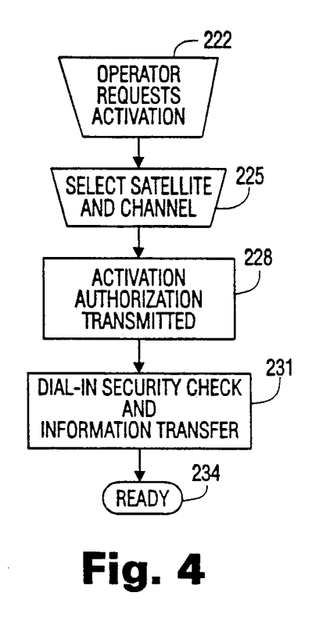
FIG. 4 is a flow chart of the initial PPV service activation procedure.

In order for an operator to receive pay-per-view programming, an account must be established with a service provider and a line of credit granted. Reference is directed to FIG. 4 which is a flow chart showing the service activation process typically employed by operators. Initially, the operator requests service activation in step 222 from the service provider by placing a telephone call and so requesting. Upon activation, the operator is advised to adjust his satellite receiving system to a specific satellite and to tune a specific channel in step 225. The service provider then transmits an information transfer in step 228, via a satellite, to the IRD, which contains activation and credit information that is stored in the descrambler module. The descrambler module then accesses the modem attached thereto and places a telephone call to the service provider in step 231 for the purpose of verifying the activation and providing a security means. Having accomplished the security check, the IRD is authorized to receive and descramble pay-per-view program events when it enters step 234.

Figure 5:
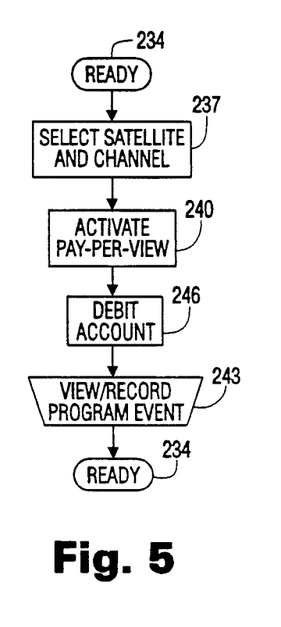
FIG. 5 is a flow chart of the conventional PPV initialization and activation procedure.

The conventional process by which pay-per-view program events are received and accounted for is depicted in FIG. 5 which is a flow chart of the process. From time to time the operator may desire to view a pay-per-view program event and causes the IRD to leave the ready step 234 by selecting the desired satellite and channel in step 237. The descrambler module prompts the operator to activate pay-per-view function in step 240 through a series of manual key entries into the remote control unit. The descrambler then will debit the operator's credit account in step 246 and the operator then may view or record the desired program event in step 243. The IRD descrambling unit returns to the READY condition at the end of the program event in step 234. The operator may continue to view pay-per-view program events so long as a credit balance remains in the descrambler memory.

Figure 6:
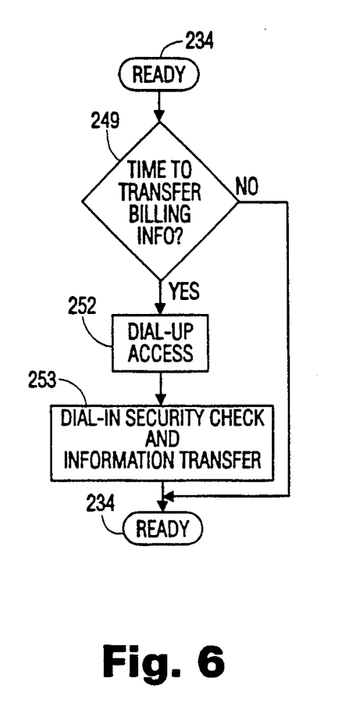
FIG. 6 is a flow chart of the PPV information data transfer procedure.

Reference is now directed to FIG. 6 which is a flow chart of the billing accounting process. From time to time the descrambler self activates from the ready condition in step 234 to initialize a billing and usage history transfer to the service provider. When the time occurs, as in step 249, the descrambler accesses the modem to dial into the telephone line and communicate with the service provider in step 252. The descrambler downloads a list of the pay-per-view program events viewed and the service provider uploads a higher credit balance if needed in step 253. Upon completion of the data transfer, the descrambler returns to the READY condition in step 234. So long as the credit balance is high enough to cover the cost of a pay-per-view program event and the descrambler is activated, the operator can manually view or record pay-per-view program events.

Figure 7:
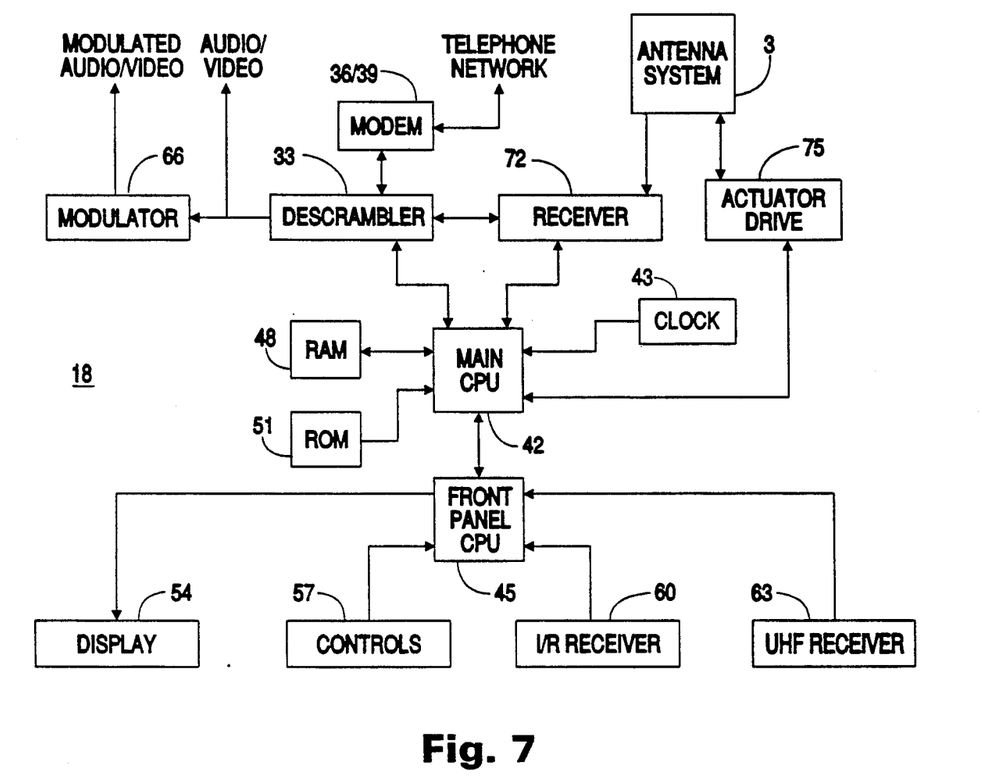
FIG. 7 is an electrical block diagram of the integrated receiver/descrambler, modem, and antenna system.

Reference is now directed to FIG. 7 which is an electrical block diagram of the IRD 18 along with the antenna system 3 in the preferred embodiment of the present invention. As shown in FIG. 7, the IRD comprises a main microprocessor (MAIN CPU) 42 and a front panel microprocessor (FRONT PANEL CPU) 45 which communicate through a microprocessor bus. The FRONT PANEL CPU 45 acts as a slave to the MAIN CPU 42 and serves to control the front panel DIS- PLAY 54, operator CONTROLS 57, infrared receiver (I/R RECEIVER) 60, and UHF RECEIVER 63.

The MAIN CPU 42 controls the overall operation of the IRD 18 by executing object code software stored in the read only memory (ROM) 51 and by both writing and reading data to and from the random access memory (RAM) 48. Communications between the various peripheral devices and the MAIN CPU 42 is accomplished with a conventional microprocessor bus.

Control of the antenna position is accomplished using an ACTUATOR DRIVE 75 circuit coupled to the MAIN CPU 42 and the ANTENNA SYSTEM 3. The MAIN CPU 42 controls the position of the ANTENNA SYSTEM 3 by sending data to the ACTUATOR DRIVE 75 circuit which in turn powers the actuator thereby affecting the movement of the ANTENNA SYSTEM 3. A feedback circuit within the ANTENNA SYSTEM 3 outputs a pulse of data for each incremental move of the ANTENNA SYSTEM 3. The pulses of data are communicated back to the MAIN CPU 42 via the ACTUATOR DRIVE 75 thereby enabling the precise determination of the ANTENNA SYSTEM 3 position by the MAIN CPU 42.

Reference is now directed to both FIG. 1 and FIG. 7. The scrambled satellite broadcast signal is initially received by the antenna system 3 as a broad band signal and coupled to the IRD 18 via cable assembly 15. The RECEIVER 72 receives the broad band signal and selectively tunes a single channel as controlled by the MAIN CPU 42. The RECEIVER 72 is of conventional design and is well known in the art. The output of the RECEIVER 72 is a baseband video signal which is still scrambled if the original broadcast was scrambled. RECEIVER 72 frequency selection and other parameters are controlled by the MAIN CPU 42.

Within the IRD 18 is incorporated a DESCRAMBLER 33. The DESCRAMBLER 33 has its own microprocessor, RAM, ROM, and software. The internal design of the descrambler is proprietary, however, the mechanical, electrical, and protocol interface to the DESCRAMBLER 33 is well known in the art. Detailed interface specifications are available from the DESCRAMBLER manufacturer. The MAIN CPU 42 communicates with the DESCRAMBLER 33 and is enabled to send commands to and receive responses from the DESCRAMBLER 33.

The scrambled output of the RECEIVER 72 is coupled to the input of the DESCRAMBLER 33. The DESCRAMBLER 33 is coupled to the MAIN CPU 42 to enable control thereof. In addition, the DESCRAMBLER 33 is coupled to either an external MODEM 36 or an internal MODEM 39. The MODEM enables communications between the DESCRAMBLER 33 and the service provider's central control point by communicating through the operator's voice telephone line into the public telephone network. The output of the DESCRAMBLER 33 is a descrambled baseband signal suitable for direct connection to a video monitor or video cassette recorder. The DESCRAMBLER 33 output is further coupled to an RF MODULATOR 66 that modulates the baseband signal onto an RF carrier thus enabling connection of the MODULATOR 66 modulated audio/video output to a conventional television or a conventional video tape recorder.

The MAIN CPU 42 is further coupled to a real time CLOCK 43 which provides for a convenience feature to the operator and a reference for the timer function used in the preferred embodiment of the present invention.

Figure 8:
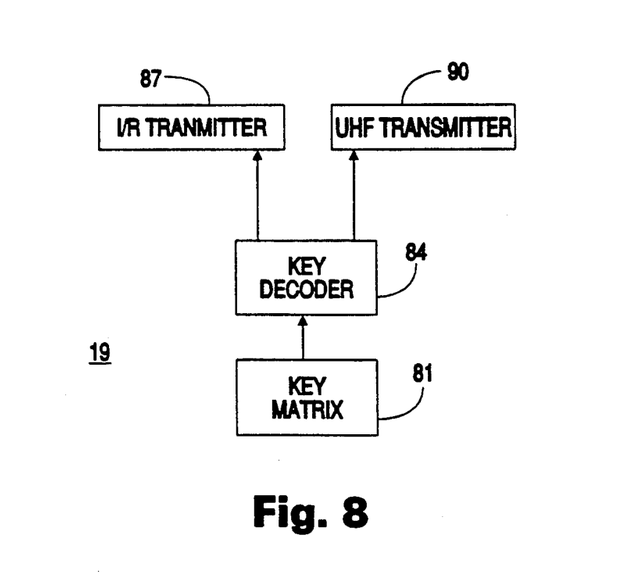
FIG. 8 is an electrical block diagram of the remote control unit for the integrated receiver/descrambler.

Reference is now directed to FIG. 8 which is an electrical block diagram of a wireless remote control unit 19 for remotely controlling the IRD in the preferred embodiment of the present invention. The wireless remote control 19 unit comprises a KEY MATRIX 81 coupled to a KEY DECODER 84 which is in turn coupled to a infrared transmitter (I/R TRANSMITTER) 87 and a UHF TRANSMITTER 90 for remote communication with the IRD. Both I/R and UHF communications modes are employed to provide reliable remote operation in both line of sight and non line of sight remote locations. As the operator depresses keys in the KEY MATRIX 81, the KEY DECODER 84 converts the information to a data stream. The data stream is transmitted via infrared light and UHF radio wave to the IRD.

In the preferred embodiment of the present invention, several steps are taken to preprogram the recording of a pay-per-view program event. The VCR is programmed to begin recording at the time the desired program event begins. This is accomplished with a conventional VCR such as those which are well known in the art. The output of the IRD is coupled to the input of the VCR with a suitable cable. The IRD is configured to have pay-per view enabled, a timer event programmed and any necessary password entered to deactivate the conventional security measures. At the predetermined time, the IRD must execute a software routine to automatically activate the reception of the pay-per-view event.

Figure 9:
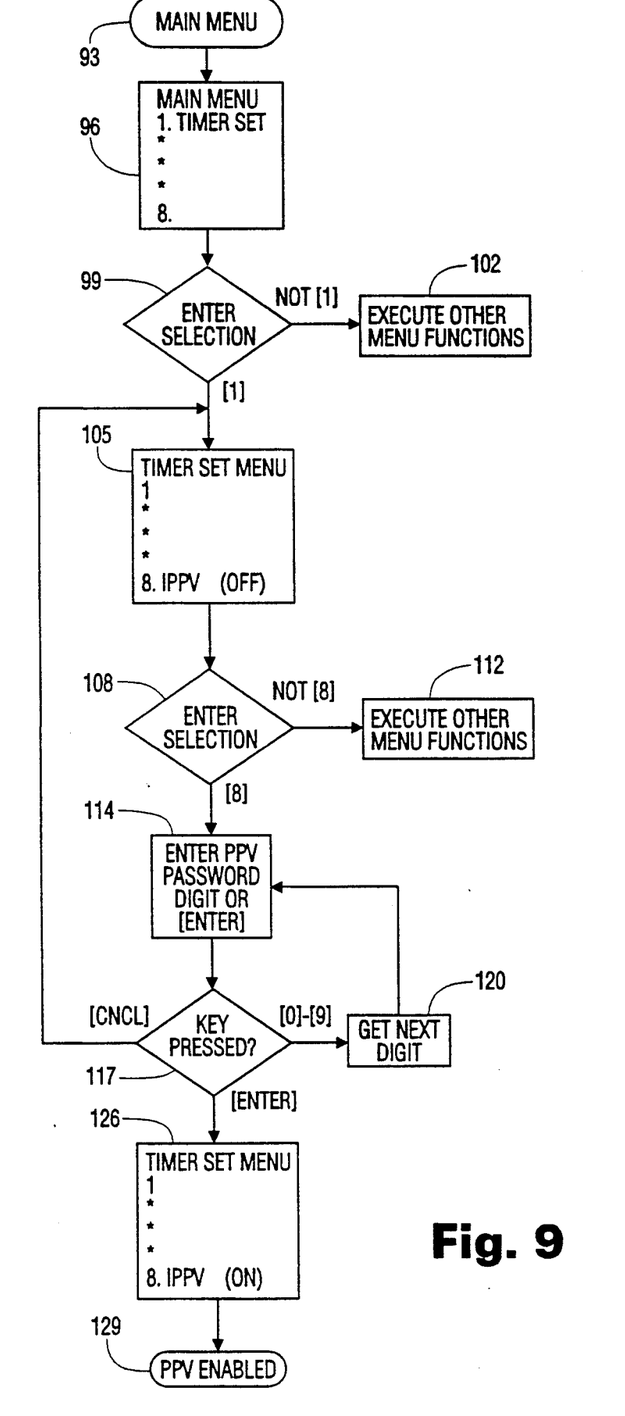
FIG. 9 is flow chart which illustrates the enabling of the pay-per-view function in the timer set feature of the present invention.

Reference is now directed to FIG. 9 which is a flow diagram of the pay-per-view enabling sequence in the preferred embodiment of the present invention. From the MAIN MENU in step 93, which is activated by pressing the [MENU] key on the remote control unit, the operator views a list of options in step 96 and enters the desired selection in step 99. The menu images are generated within the IRD and displayed on the TV. If a numeral other than [1] is entered, the IRD will execute the desired menu function as in step 102 in the conventional manner. If the numeral [1] is entered, the IRD will generate the TIMER SET MENU in step 105. The IRD will display a list of options from which the operator may chose. One of the displayed options is the current status of the pay-per-view feature. The operator then enters the desired selection in step 108. If a numeral other than [8] is selected, the IRD will execute the desired menu function in step 112 in the conventional manner. If the numeral [8] is selected, the password entry sequence is entered in step 114.

In the password entry sequence, the operator enters the password one digit at a time in step 117. The process continues to get digits by circulating through step 120 and accumulates digits until the operator enters either [ENTER] or cancel [CNCL]. If [CNCL] is entered, the IRD returns to the TIMER SET MENU at step 105. If [ENTER] is entered the TIMER SET MENU is displayed as in step 126 and the PPV option is shown as active. The process is thus complete and the PPV feature is enabled in step 129.

Figure 10:
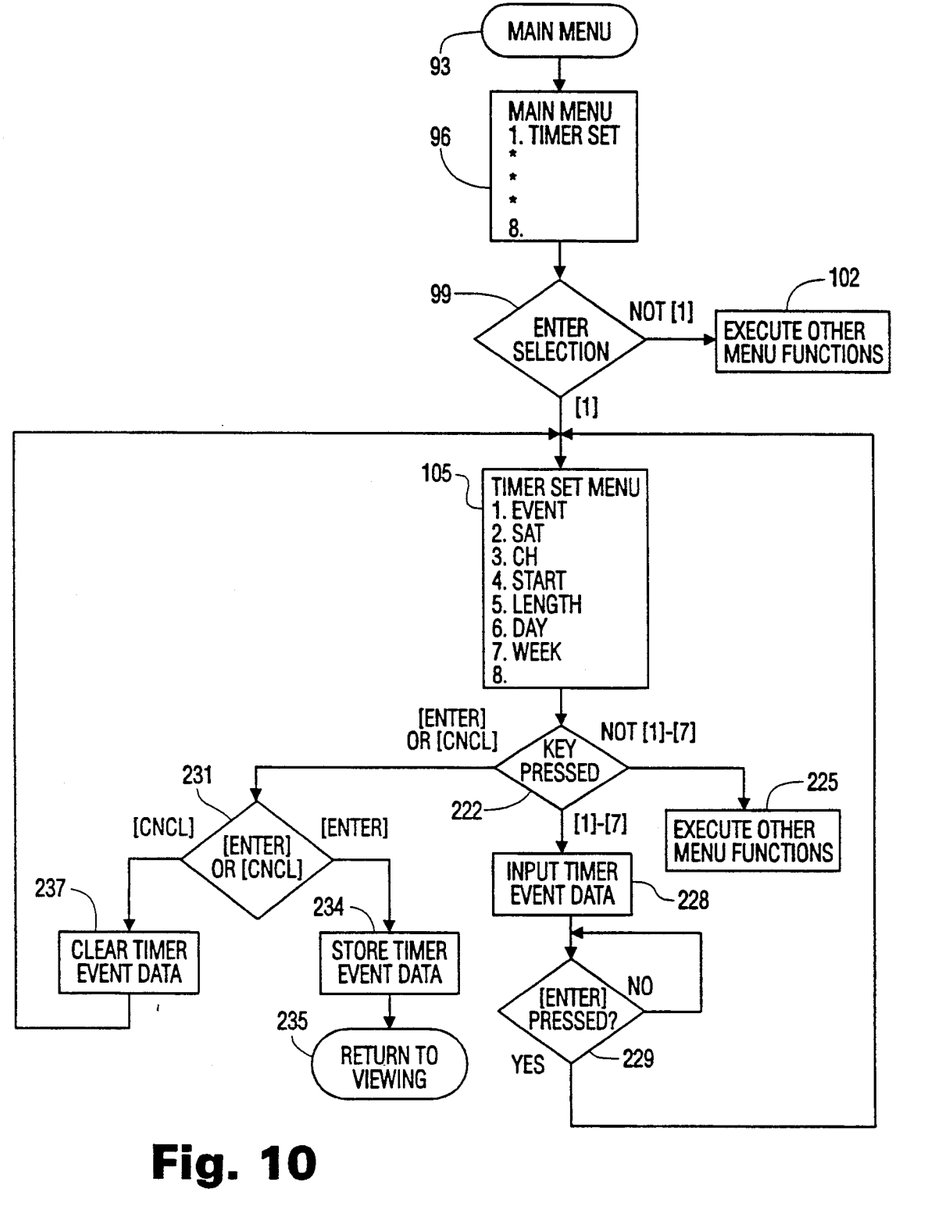
FIG. 10 is a flow chart which illustrates the timer set function of the preferred embodiment.

With PPV enabled, the operator may now enter a timer event for the purpose of initializing and activating the descrambling and reception of a PPV program event as a result of said timer event. Reference is now directed to FIG. 10 which is a flow chart of the timer event programming procedure. From the MAIN MENU in step 93, which is activated by pressing the MENU key on the remote control unit, the operator views a list of options in step 96 and enters the desired selection in step 99. If a numeral other than [1] is entered, the IRD will execute the desired menu function in step 102 in the conventional manner. If the numeral [1] is entered, the IRD will generate the TIMER SET MENU at step 105. The TIMER SET MENU 105 displays a list of parameters required to program a timed event. Each parameter is identified by a numeral and each parameter controls a particular aspect of the timer event. The parameters include:

1. EVENT A number representing the event as one of 7 possible event simultaneously programmed into the IRD,
2. SAT A two character representation of the satellite the desired program event is to be aired upon,
3. CH The particular channel the program event is to be aired upon,
4. START The time of day at which the program event begins,
5. LENGTH The duration of the program event in minutes,
6. DAY The day of the week in which the program event begins, which includes Sunday through Saturday and Daily, and
7. WEEK The week in which the program event begins, option include the current week, the subsequent week, or every week.

The operator selects each of the parameters [1]-[7] in turn and enters the desired parameter in step 222. The operator enters the required parameter in step 228 and presses [ENTER] in step 229 to enter and store the entry. Having pressed [ENTER], the process returns to the TIMER SET MENU at step 105 for selection of the next parameter. If a selection is other than parameters [1]-[7] at step 222, the IRD executes the selected selection in step 225 in the conventional manner. Upon completion of entry of the necessary parameters, the operator enters [ENTER] or alternatively cancel [CNCL] to terminate the parameter entry procedure in step 231. If [CNCL] is pressed, the IRD clears the timer event memory in step 237 and returns to the TIMER SET MENU at step 105. If [ENTER] is pressed, the IRD stores the timer event in RAM at step 234 and returns to the normal viewing mode of operation at step 235.

Figure 11:
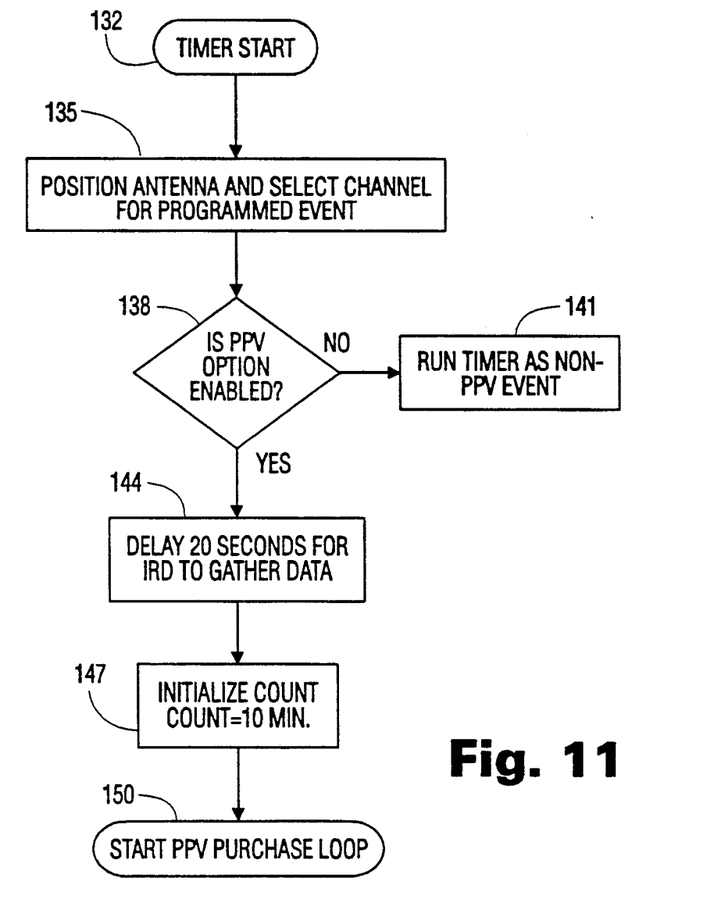
FIG. 11 is a flow chart which illustrates the activation of a timer event for a pre-programmed pay-per-view event.

Having activated the PPV function and entered a timer event, the IRD will execute the automated execution of the PPV initialization and activation procedure when the date and time of the preprogrammed timer event coincides with the date and time of the real-time clock within the IRD. Reference is now directed to FIG. 11 which is a flow chart of the timer event initialization sequence. The IRD frequently monitors the real time clock and the parameters stored in RAM for timer events. When there is a match between the current date and time and a timer event date and time, the IRD executes the timer event start sequence at step 132. The timer event parameters are recalled from RAM by the IRD and the IRD positions the antenna and selects the appropriate channel at step 135. Next, the IRD checks to confirm that the PPV option is enabled at step 138. If the PPV option is not active, the timer event runs as a non-PPV event as in step 141. In the case of a normal timer event no automatic PPV activation procedure will be executed. If the PPV option is active, the IRD will delay for 20 seconds in order to gather data from the broadcast satellite about the PPV program event at step 144. Such procedure is well known in the art. Next, the IRD initializes a count variable to ten minutes at step 147. Finally, the timer start initialization sequence is exited and the PPV PURCHASE LOOP is entered at step 150.

Within the PPV PURCHASE LOOP, the timer function automatically enters keystroke commands into the descrambler as if the operator were pressing keys on the remote control unit. The MAIN CPU executes programmed steps stored in RAM and sends commands over the microprocessor bus to the descrambler. Thus, an automated procedure is executed as follows below.

Figure 12:
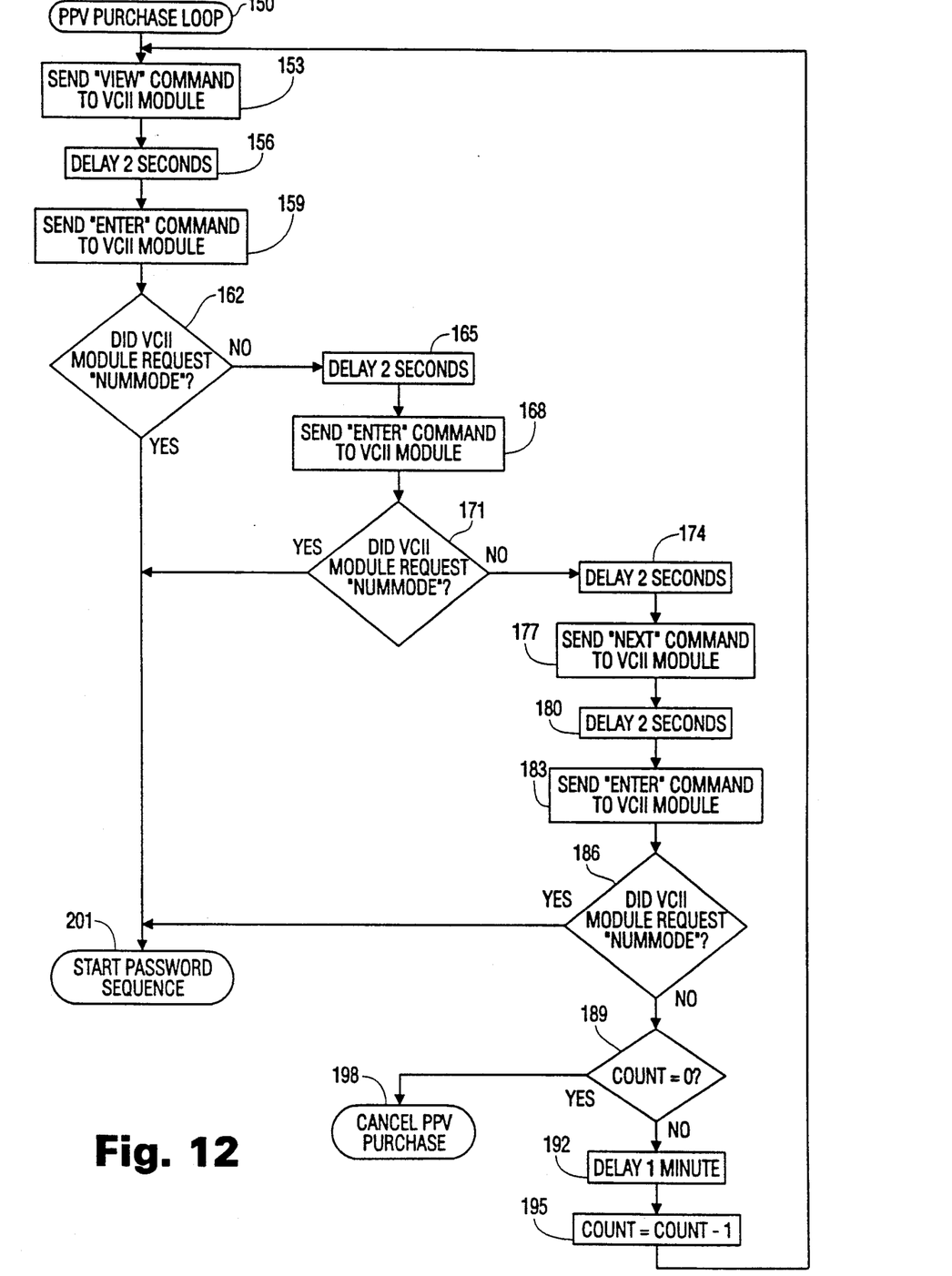
FIG. 12 is a flow chart which illustrates the PPV purchase loop and initialization procedure for a preprogrammed pay-per-view event.

The PPV PURCHASE LOOP executes the PPV initialization sequence. Reference is directed to FIG. 12 which is a flow chart of the initialization sequence. The MAIN CPU sends a "VIEW" command to the descrambler causing the flow to move from step 150 to step 153 which initializes the PPV activation sequence within the descrambler. The "VIEW" command is sent to the descrambler in the same way as it would be if the [VIEW] key were manually depressed on the remote control unit. Then, a two second delay period is entered at step 156 to allow time for the descrambler to accept the "VIEW" command. Next, an "ENTER" command is sent to the descrambler in step 159. Again, the MAIN CPU emulates the manual entry of the [ENTER] key. This technique is used for all commands sent to the descrambler in the PPV PURCHASE LOOP. With certain PPV service providers, and during certain access periods, the forgoing sequence is sufficient to activate a PPV program event and the descrambler will respond with an immediate "NUMMODE" response. The "NUMMODE" response is generated within the descrambler and indicates that the descrambler is ready to accept the password from the MAIN CPU. The IRD waits for the "NUMMODE" response in step 162. If the IRD receives the "NUMMODE" response, the IRD begins the START PASSWORD SEQUENCE at step 201. If the "NUMMODE" response is not received, the IRD delays for two seconds at step 165 and sends another "ENTER" command at step 168 to the descrambler. Again, the IRD waits for the "NUMMODE" response at step 171. If the "NUMMODE" response is received, the IRD begins the START PASSWORD SEQUENCE at step 201. If "NUMMODE" is not received, the IRD delays for two seconds at step 174 and sends a "NEXT" command at step 177 to the descrambler. Again, the IRD delays two seconds at step 180 to allow time for the descrambler to respond and then sends an "ENTER" command at step 183 to the descrambler. The IRD now waits for a "NUMMODE" response in step 186 and if it is received, the IRD begins the START PASSWORD SEQUENCE at step 201. If "NUMMODE" is not received, the IRD checks the variable COUNT and compares it with zero at step 189. If the COUNT equals zero, the PPV purchase event is canceled in step 198. If the COUNT does not equal zero, the IRD delays for one minute at step 192 and then decrements the COUNT by one at step 195 and returns to the start of the PPV PURCHASE LOOP sequence to reenter the initial "VIEW" command of step 153. The net result for the forgoing sequence is to either cancel the PPV purchase event because no "NUMMODE" response is received from the descrambler, or, to begin the START PASSWORD SEQUENCE at step 201 on receipt of the "NUMMODE" response from the descrambler.

The forgoing sequence of events comprises two processes that enable the present invention. The first process is a series of keystrokes commands and short delay periods. The sequence will initialize the PPV activation for all known PPV service providers. Unexpected commands are ignored by the descrambler and expected commands are responded to. Overlaying the foregoing sequence of steps on the required sequence of steps for all PPV service providers during all access periods where the PPV function can be initialized will result in a matched sequence of steps wherein the unneeded steps are ignored by the descrambler. Thus, the forgoing sequence of steps is operable for all periods wherein the PPV function can be initialized. The second enabling process involves the decrement of the COUNT variable and the long delay. This sequence of steps reiterates the first enabling sequence periodically until the COUNT variable has reached zero. In doing so, a window of time is defined wherein there is a high probability that the desired program event will be within an access period which allows for the initialization of a PPV program event. This provides two important functions. First it allows for a substantial error in the real time clock of the IRD and the time reference used by the service provider. Second, it allows for differences in the duration of different access periods used by different service providers. It has been determined the a COUNT variable of ten, defining a ten minute window, will provide satisfactorily high initialization success probability.

Figure 13:
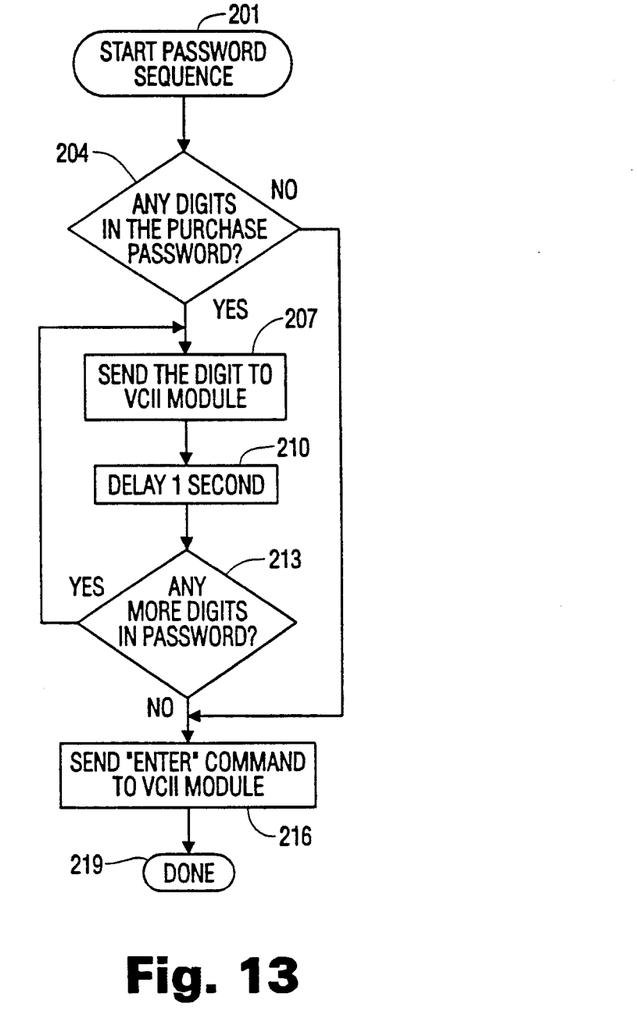
FIG. 13 is a flow chart which illustrates the password sequence for the activation of a preprogrammed pay-per view event.

Reference is now directed to FIG. 13 which is a flow diagram of the PPV activation sequence which comprises the password entry sequence to the descrambler. The password digits have been stored in RAM during the PPV enabling sequence (FIG. 9). At the time the password entry sequence is executed, the IRD automatically enters the password digits into the descrambler to activate the PPV event. The IRD first checks to see if the password has any digits, thus transitioning from step 201 to step 204. It is not uncommon that operators do not activate the password because they do not feel the need for password security. If it is the case that no password has been enter, the IRD sends an "ENTER" command at step 216 to the descrambler to acknowledge the completion of the password, which in this instance is a null set of digits. If, on the other hand there are password digits at step 204, the IRD sends the first digit to the descrambler in step 207. Next the IRD delays one second at step 210 and checks to see if any digits remain in the password at step 213. If not, the IRD sends and "ENTER" command at step 216 to the descrambler to indicate the completion of the password entry sequence. If there are more digits in the password, the IRD returns to step 207 and continues in like fashion to send digits one at a time, delaying one second between each digit, until all digits have been entered at which time the "ENTER" command at step 216 is ultimately sent to the descrambler. This completes the password entry sequence at step 219.

Having completed the PPV activation sequence by entering the correct password, the descrambler will have been enabled and will subsequently enable the descrambling operation. Consequently, in accordance with the operation of the IRD, the descrambled video signal will be present at both the baseband video output and modulated video output terminals of the IRD. This sequence will have occurred automatically in accordance with the programming instructions entered by the operator during the timer event programming in the TIMER SET MENU. If, as discussed earlier, the operator had programmed a similar timer event in a VCR which caused the VCR to begin recording at the time the program event began, and, the VCR's record input was coupled to the IRD record output, the program event would be automatically recorded.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A method of initializing a descrambler in a pay-per-view program event receiver, comprising the steps of:
   automatically executing plural different command sequences for the purpose of soliciting a positive response from said descrambler, for any one of said plural different command sequence, and
   upon receiving said positive response after any of said command sequences, executing an activation sequence.

2. A method of initializing a descrambler in a pay-per-view program event receiver, comprising the steps of:
   initializing a counter variable to a first value,
   automatically executing one of plural different command sequences for the purpose of soliciting a positive response from said descrambler,
   delaying a first period of time to receive said positive response,
   upon expiration of said first period of time, and having not received said positive response, delaying a second period of time and decrementing said count variable,
   subsequently executing one of said plural different command sequences and delaying for said first and second periods of time and decrementing said count variable repeatedly,
   terminating said initialization sequence upon said count variable being decremented until said count variable is equal to or less than zero, and having not received said positive response, and
   upon receiving said positive response, executing an activation sequence.

3. The method of claim 2, wherein said activation sequence further comprises the steps of:
   automatically sending a password of zero or more digits to said descrambler, and
   entering password into said descrambler.

4. A method of activating a descrambler in a pay-per-view program event receiver, comprising the steps of:
   enabling the pay-per-view descrambling function, further comprising the steps of:
      manually accessing a pay-per-view enabling option,
      manually selecting said enabling option,
      executing a timer event activation sequence, further comprising the steps of:
         entering and storing timer event parameters in a memory,
         periodically monitoring a real time clock to read a real time variable and comparing said parameters with said real time variable, activating a timer event in response to said real time variable being equal to or greater than said timer event parameter, initializing a counter variable to a first value, initializing said descrambler, further comprising the steps of:

automatically executing plural different command sequences for the purpose of soliciting a positive response from said descrambler, upon receiving said positive response after any of said command sequences, executing an activation sequence, delaying a first period of time to receive said positive response, upon expiration of said first period of time, and having not received said positive response, delaying a second period of time and decrementing said count variable, subsequently executing said initialization sequence and delaying for said first and second periods of time and decrementing said count variable repeatedly, terminating said initialization sequence upon said count variable being decremented until said count variable is equal to or less than zero, and having not received said positive response, and upon receiving said positive response, executing said activation sequence.

upon receiving said positive response, executing an activation sequence, further comprising the steps of:

automatically sending a password of zero or more digits to said descrambler, and entering said password into said descrambler.

5. A method of initializing a descrambler in a pay-per-view program event receiver, comprising the steps of:

executing a first sequence of commands and delaying for a first period of time for the purpose of soliciting a positive response from said descrambler, upon the expiration of said first period of time and having not receiving said positive response, executing a second sequence of commands and delaying a second period of time, upon expiration of said second period of time and having not received said positive response, executing a third sequence of commands and delaying a third period of time, and upon receiving said positive response after any one of said sequences one, two, or three, executing an activation sequence.

6. The method of claim 5, wherein said initialization sequence further comprises the steps of:

initializing a counter variable to a first value, executing said initialization sequence, delaying a first period of time to receive said positive response, upon expiration of said first period of time, and having not received said positive response, delaying a second period of time and decrementing said count variable, subsequently executing said initialization sequence and delaying for said first and second periods of time and decrementing said count variable repeatedly, terminating said initialization sequence upon said count variable being decremented until said count variable is equal to or less than zero, and having not received said positive response, and upon receiving said positive response, executing said activation sequence.

7. The method of claim 6, wherein said activation sequence further comprises the steps of:

automatically sending a password of zero or more digits to said descrambler, and entering password into said descrambler.

8. A method of activating a descrambler in a pay-per-view program event receiver, comprising the steps of:

enabling the pay-per-view descrambling function, further comprising the steps of:

manually accessing a pay-per-view enabling option, manually selecting said enabling option, executing a timer event activation sequence, further comprising the steps of:

entering and storing timer event parameters in a memory, periodically monitoring a real time clock to read a real time variable and comparing said parameters with said real time variable, activating a timer event in response to said real time variable being equal to or greater than said timer event parameters, initializing a counter variable to a first value, initializing said descrambler, further comprising the steps of:

executing a first sequence of commands and delaying a first period of time for the purpose of soliciting a positive response from said descrambler, upon expiration of said first period of time and having not receiving said positive response, executing a second sequence of commands and delaying a second period of time, upon expiration of said second period of time and having not received said positive response, executing a third sequence of commands, and upon receiving said positive response after any one of said sequences one, two, or three, executing an activation sequence, delaying a third period of time to receive said positive response, upon not receiving said positive response, delaying a fourth period of time and decrementing said count variable, subsequently executing said initialization sequence and delaying for said third and fourth periods of time and decrementing said count variable repeatedly, terminating said initialization sequence upon said count variable being decremented until said count variable is equal to or less than zero, and having not received said positive response, upon receiving said positive response, executing an activation sequence, further comprising the steps of:

automatically sending a password of zero or more digits to said descrambler, and entering said password into said descrambler.

9. A method for advance programming to receive a specific pay-per-view program event through a receiving system which is capable of receiving pay-per-view program events from a plurality of service providers each of which uses a different activation and authorization sequence for receiving a pay-per-view program event, the receiving system including a control processor and descrambler, wherein the method comprises the steps of:

entering a first set of commands into the control processor of the receiving system, wherein the first set of commands defines the specific pay-per-view event to be received at a future time, in response to said first set of commands, generating by said control processor at one or more times related to said future time, a sequence of control signals which are provided to the descrambler in said receiving system, said sequence of control signals providing all command inputs required said activation and authorization sequences for said plurality of service providers, thereby activating said descrambler for receiving said specific program event, and receiving said specific program event by said receiving system from said one of said service providers after activation of said descrambler.

10. A method for advance programming to receive a specific pay-per-view program event through a receiving system which is capable of receiving pay-per-view program events from a plurality of service providers each of which uses a different activation and authorization sequence for receiving a pay-per-view program event, the receiving system including a control processor and descrambler, wherein the method comprises the steps of:

entering a first set of commands into the control processor of the receiving system, wherein the first set of commands includes a pay-per-view password and defines a specific pay-per-view program event to be received at a future time, generating by said control processor at a time prior to said future time, a sequence of control signals which are provided to the descrambler in said receiving system, said activation and authorization sequences for said plurality of service providers, monitoring said descrambler by said control processor to receive a response to said control signals from said descrambler and repeating said step of generating when said response has not been received for a predetermined period of time, upon receipt of said descrambler response by said control processor, transmitting said pay-per-view password from said control processor to said descrambler for activating said descrambler, and receiving said specific program event by said receiving system from said one of said service providers after activation of said descrambler.

11. A method of initializing a descrambler in a pay-per-view receiver, comprising the steps of:

automatically executing a first sequence of commands and delaying for a period of time for the purpose of soliciting a positive response from said descrambler, upon the expiration of said period of time and having not received said positive response, repeatedly automatically executing additional sequences of commands and delaying a period of time after each for the purpose of soliciting said positive response, and upon receiving said positive response after any one of said sequences, executing an activation sequence.

* * * * *